May 23, 1933.  G. REISINGER  1,910,123
TOOL
Filed Dec. 5, 1928
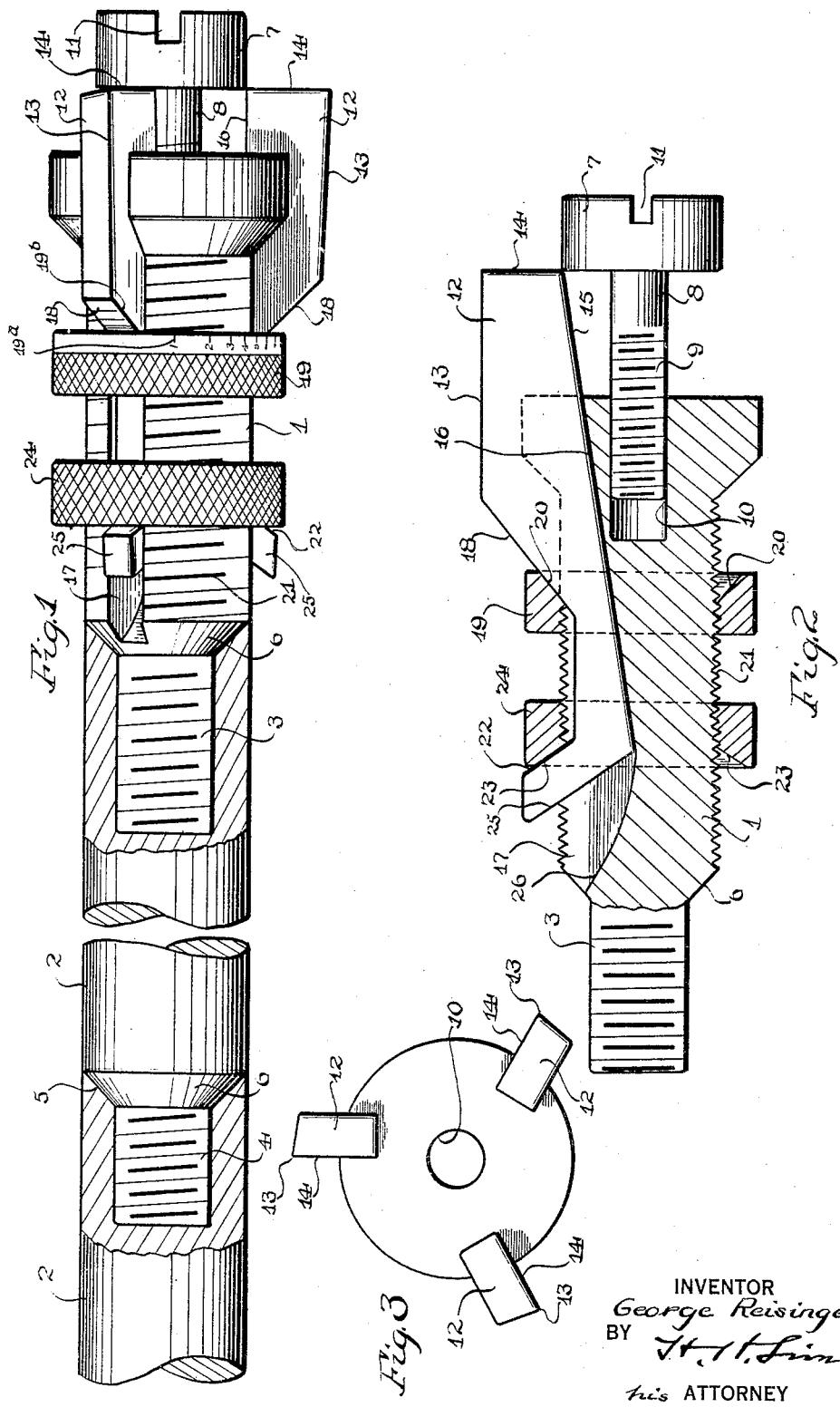
INVENTOR
George Reisinger
BY
his ATTORNEY Patented May 23, 1933

1,910,123

UNITED STATES PATENT OFFICE

GEORGE REISINGER, OF ROCHESTER, NEW YORK

TOOL

Application filed December 5, 1928. Serial No. 323,984.

The present invention relates to tools for counter sinking, spot facing, boring and/or reaming and an object of this invention is to provide a construction which has a centering device and is adjustable to cut openings of different diameters. Another object of the invention is to provide a tool of this character which has a centering device removable so that the centering devices of other diameters may be employed, combined with cutting blades which are adjustable to cut openings or bores of different diameters. Still another object of the invention is to provide in connection with a centering device which is removable and adjustable longitudinally of the stem of the tool, cutting blades which are adjustable longitudinally of the stem for the purpose of effecting the radial adjustment of the blades. A still further object of the invention is to provide a novel means of securing the blades or cutters in position on the stem while permitting ready removal. Still another and further object of the invention is to provide an expansible tool which may be used as a borer or reamer.

To these and other ends, the invention consists of certain parts and combinations of parts, all of which will be hereinafter described: the novel features being pointed out in the appended claims.

In the drawing:

Fig. 1 is a side view of the tool with parts in section;

Fig. 2 is a longitudinal section through the tool; and

Fig. 3 is an end view of the tool with the centering device removed.

Referring more particularly to the illustrated embodiment of the invention, there is employed a stem comprising, in this instance, an end member section 1 and a plurality of sections 2, the end member section having a reduced screw threaded portion 3 fitting in an internally threaded bore in one end of the sections 2, the other end of the sections 2 having a screw threaded extension 4 fitting in an internally threaded bore in one end of another section 2. The ends of the sections having the bores are formed with flaring seats 5 for cooperating with tapered seats 6 on the part interlocking therewith. This stem makes it possible to provide a stem of any desired length, the sections of which are held together in an effective manner.

At the end of the stem provided with the head section 1 is arranged a centering device 7 which is both removable and adjustable longitudinally of the stem. To this end, it is provided with a reduced extension 8 externally threaded at 9 and fitted in an internally threaded bore 10 in the head section 1. A slot 11 is provided in the centering portion by which the centering device may be turned to effect adjustment or removal of the centering device from the stem.

The cutting blades 12 are, in this instance, three in number and have longitudinally extending cutting edges 13 and transverse cutting edges 14 at their ends adjacent the centering device 7. The blades are radially adjustable to cut bores of different diameters.

The radial adjustment, in this instance, is secured by moving the blades longitudinally of the stem and providing them with guide surfaces 15 at slight angles to their cutting edges 14, these guide surfaces cooperating with guide surfaces 16 on the end member 1 formed at the bottom of longitudinally extending grooves 17 in the end member 1, the guide surfaces 16 being at slight angles to the longitudinal axis of the stem so that as the blades 12 move toward the adjacent end of the stem, their cutting edges 13 separate and vice versa. The extreme ends of the blades at their cutting edges 14 abut the rear face of the centering device 7 which is adjusted longitudinally of the stem for different adjustments of the blades 12.

The blades are held in their adjusted positions by being forced against the bottoms of the longitudinally extending slots or grooves 17. This is accomplished, in this instance, by notching each blade adjacent its rear end and in rear of its cutting edges to provide an inclined shoulder 18, and engaging the shoulders 18 of each of the blades with an adjusting ring 19 which has an internal flaring portion 20 cooperating with said shoulders 18. The ring is adjustable axially of the stem by internally threading the same and engaging said threads with threads surrounding the stem section 1.

To positively lock the blades in their adjusted positions, the blades have inclined shoulders 22 opposed to the shoulders 18 and with which engage a flaring surface 23 on a locking ring 24 which is internally threaded and engages the threads 21 on the stem.

Removal of the blades for repair or replacement is secured by inclining or reducing their rear ends at 25 and extending the slots at 26 so that then the two nuts 19 and 24 are moved toward each other, the blades may be turned and passed through their slots beneath the rings at their rear ends.

With this invention, the centering device which centers the tool for spot facing and counter sinking is removable so that it may be replaced by others of different diameters. The cutting blades are radially adjustable in rear of the centering device and have transverse cutting edges for cutting counter bores, for spot facing and for boring. Longitudinally extending cutting edges are provided on the blade permitting the tool to be employed as a reamer. When the tool is used for boring or reaming the centering device is removed. The radial adjustment of the blades is effected by the longitudinal movement of the blades and the longitudinal adjustment of the centering device against which the blades abut. By providing graduations on the ring 19 as at 19$^a$, and an index 19$^b$ on one of the blades, the amount of the adjustment may be determined or the diameter of the bore to be made by the tool ascertained. The blades are so constructed that they may pass beneath the adjusting ring for ready removal.

What I claim as my invention and desire to secure by Letters Patent is:

1. An expansible tool comprising a stem provided with longitudinally extending grooves, the bottoms of the grooves being inclined, and the stem also being externally threaded at its grooved portion, longitudinally adjustable blades fitting in said grooves and each having a longitudinally extending cutting edge, each of said blades having a recess in rear of its longitudinally extending cutting edge and on one and the same side of said edge, the opposite side walls of said recess being inclined to said inclined grooves and being inclined opposite to each other to form two facing abutments, and two nuts adjustable on the screw threaded portion of the stem, surrounding a portion of each blade, and lying in the recess between the two abutments of each blade, one nut engaging one abutment to adjustably move said blades in one direction and the other engaging the other abutment to adjustably move said blades in the opposite direction and both of said nuts when in engagement with both abutments operating to lock said cutting blades against movement in either direction and to clamp said blades in said inclined grooves.

2. An expansible tool comprising a stem formed with longitudinally extending slots, said stem being externally threaded at its slotted portion, cutting blades adjustable longitudinally of said slots and each provided in rear of the cutting edges with a recess, the opposite side walls of which form facing abutments, and two nuts adjustable on the screw threaded portion of the stems and lying in the recesses between the facing abutments of each blade, one of said nuts cooperating with one abutment on each blade, and the other cooperating with the other abutment of each blade, the inner ends of the blades being reduced to permit them to pass beneath the nuts on the stem.

GEORGE REISINGER.